Sept. 24, 1968  L. C. CROPP ET AL  3,403,242
SOLDERING MACHINE

Filed Nov. 1, 1966  5 Sheets-Sheet 1

INVENTORS
LELAND C. CROPP
BY CHARLES R. VAUGHT

Robert E. Strausser
ATTORNEY

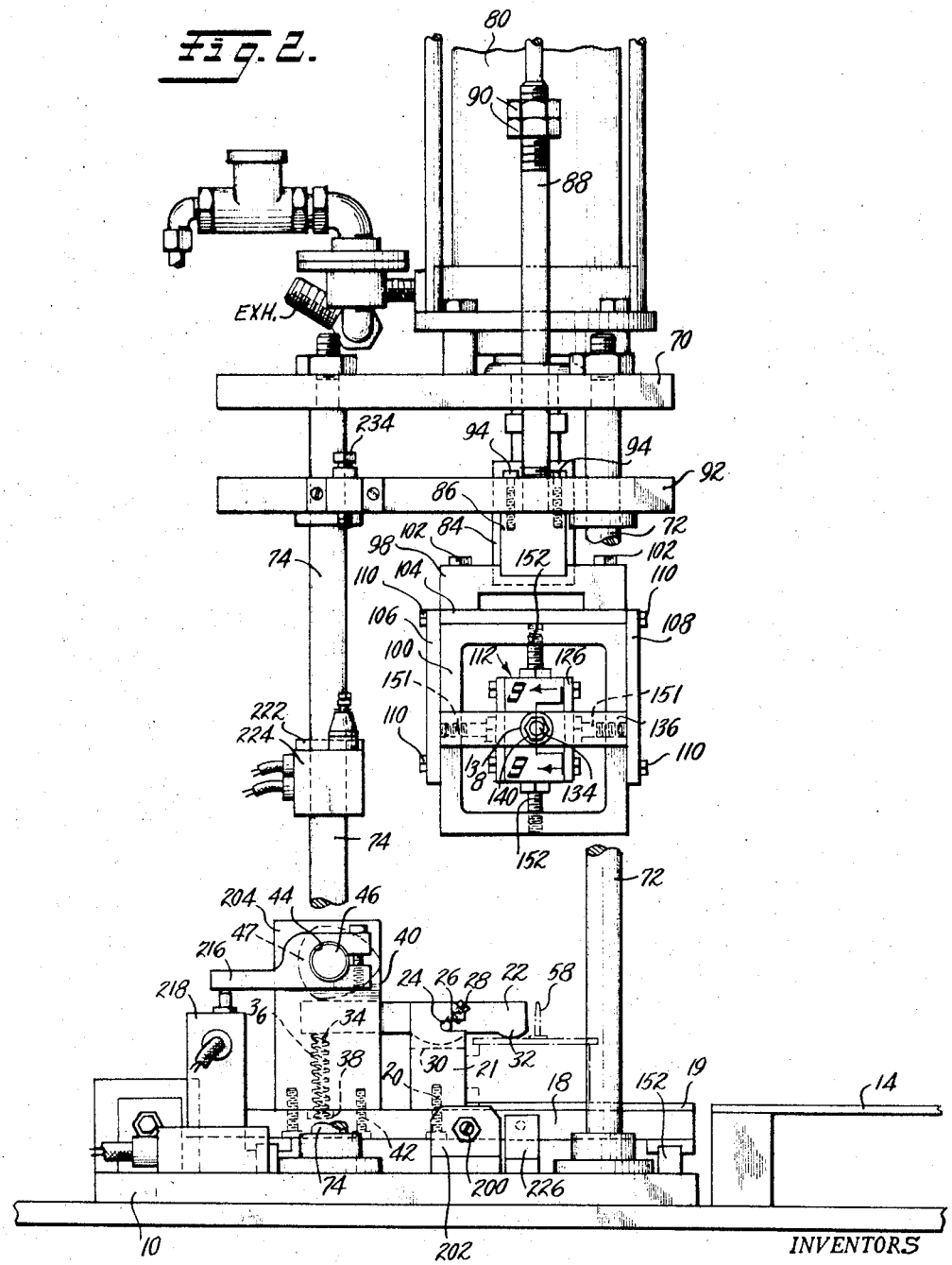

Sept. 24, 1968  L. C. CROPP ET AL  3,403,242
SOLDERING MACHINE
Filed Nov. 1, 1966
5 Sheets-Sheet 3
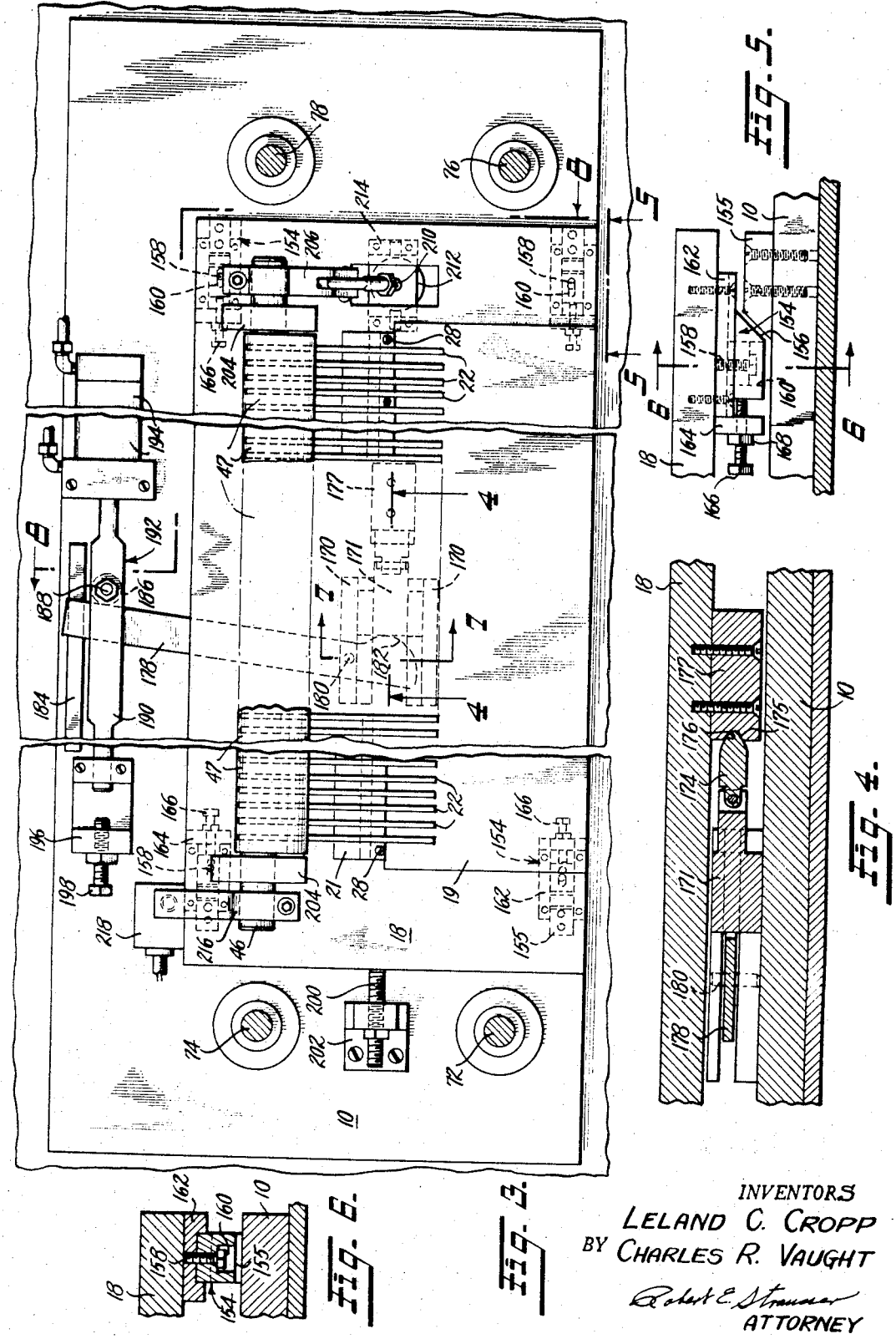
INVENTORS
LELAND C. CROPP
BY CHARLES R. VAUGHT
ATTORNEY

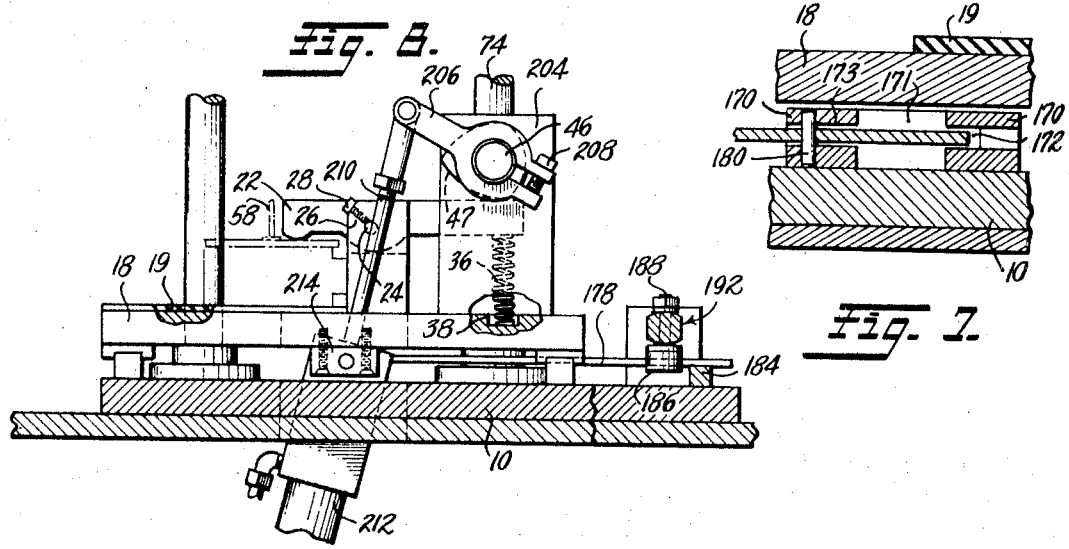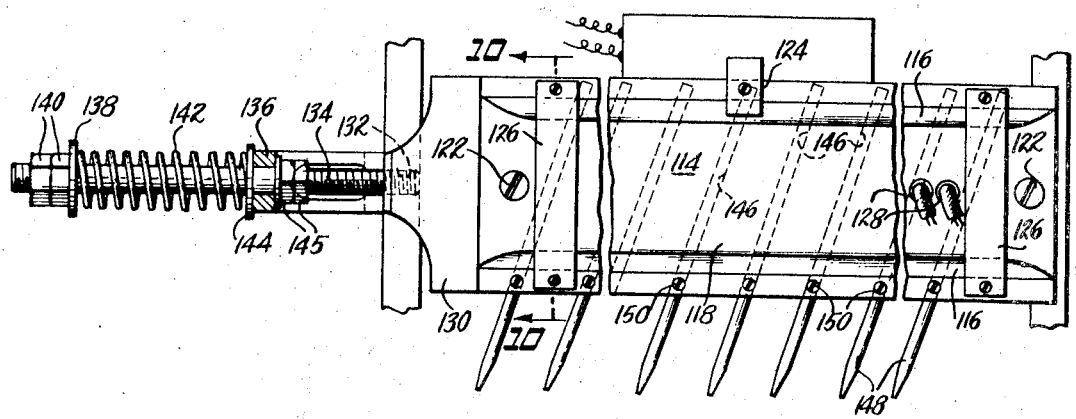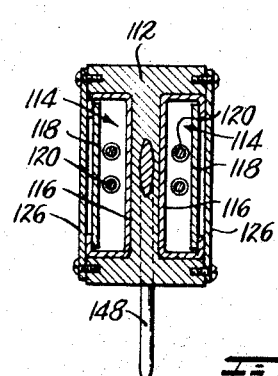

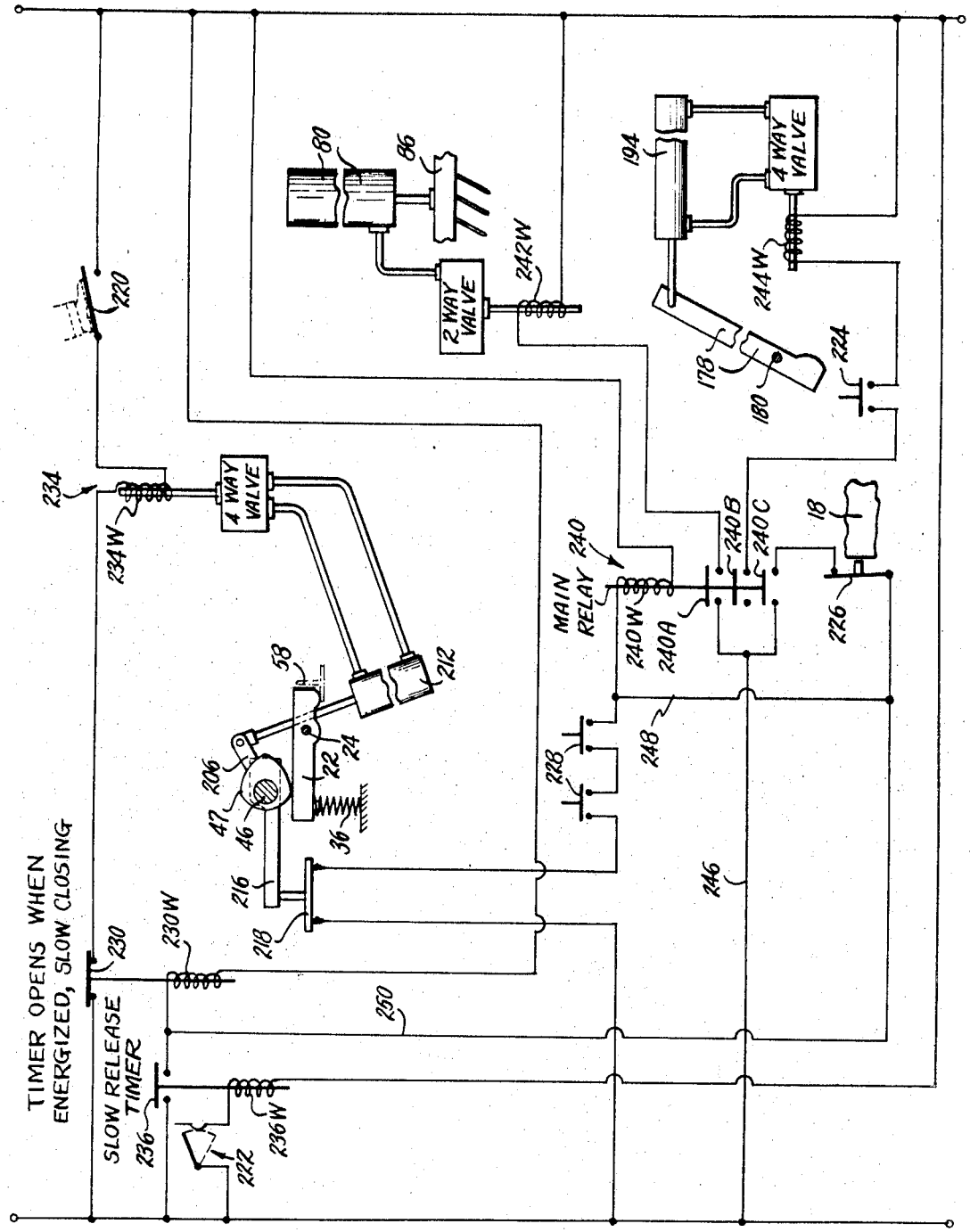

United States Patent Office 3,403,242
Patented Sept. 24, 1968

3,403,242
SOLDERING MACHINE
Leland C. Cropp, Oil City, and Charles R. Vaught, Titusville, Pa., assignors to Sylvania Electric Products Inc., a corporation of Delaware
Filed Nov. 1, 1966, Ser. No. 591,291
11 Claims. (Cl. 219—85)

This invention relates to a soldering device and more particularly to a machine for soldering a multiple number of contacts in position on a contact carrying block.

It is an object of this invention to provide a machine which shall automatically effect a simultaneous soldering of a large number of contact pins to other elements.

More specifically it is an object of this invention to provide a machine which shall effect the simultaneous soldering of a large number of contact pins in a contact block to a common bus line or to a common ground plate associated with the block.

For a better understanding of the present invention, together with other and further objects, advantages, and capabilities thereof, reference is made to the following specification and appended claims in connection with the acompanying drawings in which:

FIG. 2 is an enlarged fragmentary side elevational view as viewed from the left side of the machine of FIG. 1 looking in the direction of the arrows 2—2;

FIG. 3 is an enlarged fragmentary horizontal plan view, partly in section, taken on the line 3—3 of FIG. 1;

FIG. 4 is an enlarged fragmentary vertical sectional view, taken on the line 4—4 of FIG. 3, showing the pusher mechanism for actuating the table;

FIG. 5 is an enlarged fragmentary end elevational view of one set of the actuating cams for raising and shifting the table, taken on the line 5—5 of FIG. 3;

FIG. 6 is a fragmentary vertical sectional view taken on the line 6—6 of FIG. 5;

FIG. 7 is a fragmentary vertical sectional view taken on the line 7—7 of FIG. 3;

FIG. 8 is a fragmentary staggered end elevational view, partly in section, taken on the line 8—8 of FIG. 3;

FIG. 9 is an enlarged fragmentary front elevational view, partly in section, of the heating element of the soldering machine, taken substantially on the line 9—9 of FIG. 2.

FIG. 10 is a vertical sectional view, taken on the line 10—10 through the heating element of FIG. 9.

FIG. 13 is a wiring diagram of circuits employed in the machine.

Figure 1:
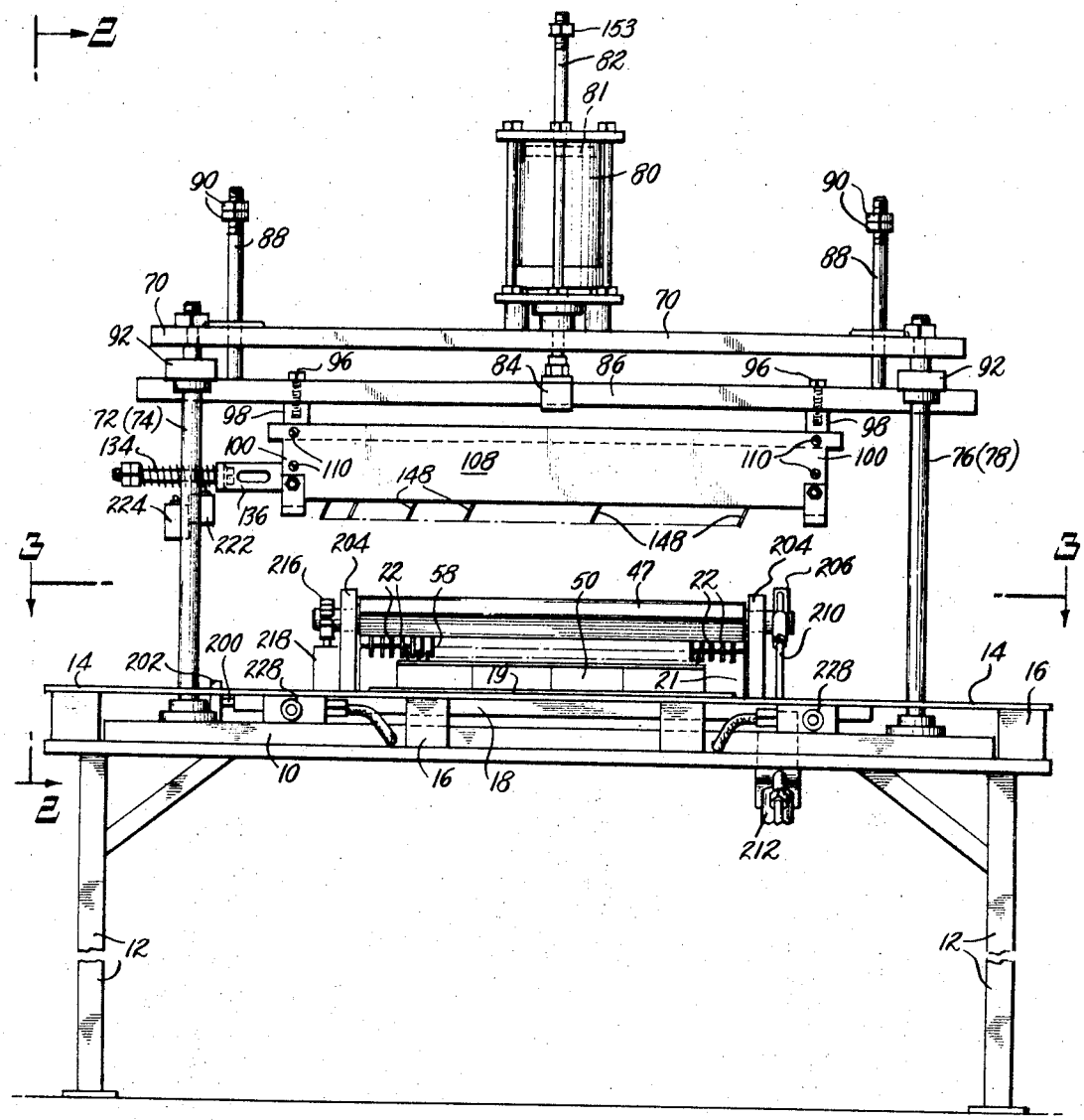
FIG. 1 is a front elevational view of the soldering machine of the present invention.

Now referring to the drawings in greater detail, the machine comprises a table top 10 supported on a table with legs 12, said table top having a work supporting plate 14 spaced thereabove, as by a plurality of spacers 16. Closely adjacent to and to the rear of the work supporting plate is an elevatable table 18 (FIG. 2) which in its normal position of rest has its top surface in the plane of the top surface of the aforementioned work supporting plate. This table 18 is coated with a strip of resilient material 19 to support a workpiece. Directly fastened to the upper surface of table 18, as by cap screws 20, is an elongated rectangular block 21 (FIGS. 1, 2 and 3) provided with a multiplicity of clamps in the form of individually mounted clamping fingers 22. These clamping fingers are each individually pivotally mounted on a rod 24 (FIG. 2), circular in cross-section, this rod being positioned in a horizontal longitudinal recess 26 in the front face of the block 21, adjacent the upper end thereof. One or more inclined bolts 28 threaded into the block and engaging the rod 24 serve to hold the rod in place. Each finger is pivotally movable in a vertical fore and aft slot 30 in the top surface of the block. Each of the fingers is pivoted intermediate of its ends, and the forward end of the finger, that is the end of the finger nearest the operator at the front of the machine, has a downwardly turned end 32 to engage an upper face of a wire wrap terminal or contact pin carrying block whose terminals are to be soldered to a ground plane or to a bus line, as will be described. Each finger also has a downwardly directed projection 34 to seat a spring 36, individual to each finger, each spring reacting between the rear end of a finger and the bottom of a circular recess 38 in the elevatable table 18. Adjacent each lateral end of the table 18, at the rear thereof is a bearing block 40, held to the table 18 in any convenient fashion as by cap screws 42. Journalled in apertures 44 in these bearing blocks is a cam shaft 46, normally in such a position of the cam that the front end of the fingers are released to the action of the springs and are in their down position. This cam shaft is above the rear ends of the fingers, the cam shaft being formed with a single lobed cam surface 47 extending longitudinally across all of the fingers and acting when the shaft is oscillated clockwise when viewed from the left-hand end of the machine to depress the rear ends of the fingers against the action of the springs 36 and to raise the forward ends of the fingers, all in order to free the contact carrying blocks from the fingers to permit the operator to insert or remove the block assembly.

Figure 11:
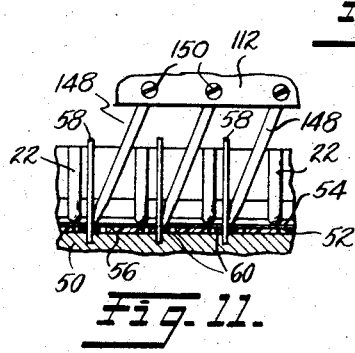
FIG. 11 is an enlarged fragmentary elevational view, partly in section, showing the clamping and heating elements in soldering position.
Figure 12:
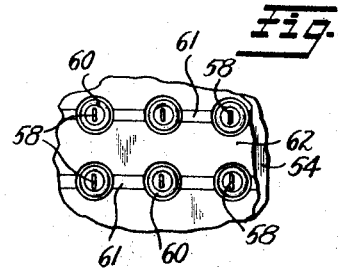
FIG. 12 is a fragmentary top plan view of a form of contact carrying block.

As an example of a contact carrying block assembly which is to be processed by the machine of this invention, attention is directed to FIG. 11 wherein there is shown a fragmentary portion of a contact carrying block 50. The block has on its upper surface an insulating plate 52 covered by a conductive coating 54 which coating however, prior to processing by the machine of this invention, is apertured as at 56 to surround each of the contact pins or wire wrap terminals 58 to prevent short circulating of the terminals. If, however, a ring of solder, as 60, is placed at the base of a terminal and the solder is melted, as will be explained, that terminal will be grounded to the conductive coating. If desired (FIG. 12) an additional apertured insulating plate as 62 may be placed on the coating 54 with strips of conductive leads 61 running longitudinally of the plate 62 and which leads may be soldered to the terminals, as through the intermediary of the solder rings. The clamping fingers 22 not only hold the block in proper position but serve to press the layers of material on the block firmly in position against the block prior to the soldering operation.

In order to effect the melting of the solder rings about the wire wrap terminals 58, individual soldering tips 148 are lowered and brought in position adjacent a horizontal longitudinal row of these terminals, one tip for each terminal in the row, these tips being moved down to an intermediate level of the exposed portions of the terminals extending above the contact carrying blocks in alignment with a longitudinal row of terminals, but spaced away from the terminals. Then, in order to effect physical contact of the tips with the terminals, the table is elevated and simultaneously moved laterally, lengthwise of the machine, to cause the terminals to come into engagement with the tips and the solder ring, the terminals sliding upwardly against the tips to insure good heat transfer from the tips to the pins. The parts come to rest with the tips engaging the solder rings at the base of the terminals. The heat imparted to the terminals and solder then causes the solder to melt to fuse together the terminal and conductive coating on the block (or conductive lead). How this is brought about will now be explained.

Mounted on top of a bridge plate 70 which is supported by four posts 72, 74, 76 and 78 is an air cylinder 80 having a piston 81 and whose piston rod 82 extends freely through an opening in the bridge plate and to whose lower end is threaded a coupling 84 provided with a rectangular thru opening to freely accommodate a rectangular lift bar 86, this bar indirectly supporting the soldering tips. The lift bar is provided with two motion limiting rods 88, one near each longitudinal end of the bar, said rods sliding through guide openings in the bridge plate 70, the upper ends of these guide rods being threaded and provided with nuts 90 to limit the downward movement of the lift bar and the soldering tips indirectly supported thereby. The lift bar is also rigidly secured to end slide bars 92 as by screws 94 (FIG. 2). The slide bars include roller bearings sliding on the four posts. Supported by the lift bar, near each end of the lift bar, as by a cap screw 96, is a bridge piece 98 (FIG. 1), these bridge pieces in turn supporting rectangular metal frame pieces 100; screws 102, FIG. 2, passing through the bridge pieces and threaded into the frame pieces clamp the bridge pieces and frame pieces together but with a heat insulating plate 104 of suitable material, as hard pressed asbestos board, between the two. This insulating plate forms the top of a heat shielding, open bottom, box, the other two walls 106, 108 of the box being vertical walls of material similar to that of plate 104 and held to the frame pieces in any suitable manner, as by screws 110.

Within the heat insulating box is supported a good heat conducting bar 112 as of copper or of an alloy steel, heated by longitudinal heating elements placed laterally against the heat conducting bar, said bar carrying inclined solder tips 148.

The heat conducting bar 112 (FIGS. 9 and 10), in cross section, is shaped like an I-bar, with a heating element 114 in each channel of the I-bar.

The heating element is comprised of a channeled metallic back plate 116 lapped over a metallic cover plate 118 enclosing therewithin an insulated heating element 120. The heating element is retained in the I-bar in any suitable fashion as by screws 122 (FIG. 9) passing through the ends of the heater elements and threaded into the I-bar. Additionally cleats 124 and bridge pieces 126 may be employed to hold the heating element firmly against the bar. The ends of the heater wire in each heater is brought out to terminals 128 suitably mica insulated from the cover plates of the heater. The left-hand end of the I-bar is formed into a coupling block 130 internally threaded as at 132 to receive a long screw threaded member 134. This screw threaded member passes freely through an end bridge piece 136 (FIGS. 1, 2 and 9) to beyond the same. A washer 138 is placed at the left-hand free end of the threaded member and lock nuts 140 are threaded onto the end of the member. A spring 142 interposed between the washer 138 and a second washer 144 against the bridge piece yieldingly resists right-hand motion of the I-bar. Left-hand motion of the I-bar is limited by stop nuts 145 engaging the bridge piece 136. The I-bar is provided with a multiplicity of bores 146 therethrough extending from top to bottom of the bar and at an angle of approxiamtely 20° extending downwardly and toward the left, as viewed from the front of the machine. There are at least as many bores as there are rows of terminals, from left to right, on the contact block to be processed and in each of these bores is located a soldering tip 148. Each of these tips is of a good heat conductive material, as of copper or copper alloy, and each has a screw driver shaped tip to eventually come into broadside engagement with the flat face of a terminal and the solder on the block. Preferably, the tip should be shaped to conform to the external curvature of the terminal for best heat conductance. The terminals are held in the bores by set screws 150. The I-bar is movably supported in the heat insulating box by means of screws 151 threaded into the end frame, slidably abutting the bridge plates 126 on the I-bar and by screws 152 slidably abutting the top and bottom of the I-bar. The parts carried by the lift bar 86 are quite massive and will normally gravitate to a position until the nuts 90 on the supporting rods 88 engage the top surface of the bridge plate 70. The cylinder 80 is utilized to raise the soldering tip assembly and will allow the assembly to gravitate downwardly when air is released from the cylinder. In order to hold the assembly raised, in the absence of fluid pressure, as when replacing soldering tips, the nut 153 may be removed and a hollow tube (not shown) slipped over the extension of piston rod 82 above the cylinder with the threaded end exposed, in the lifted position of the assembly as when air is admitted into the cylinder. By threading the nut on again, the nut will engage the top of the tube, when the assembly is allowed to gravitate.

The table 18 is caused to rise and move the terminals in the blocks carried by the table into contact with the lowered set of soldering tips by moving the table laterally. The underface of the table is provided with four camming wedges 154, FIG. 5, one adjacent each corner of the table cooperating with four wedges 155 mounted on the top of table 10. Each of the camming wedges 154 is a block of hard material with a 45° angle cam face 156 secured to the under face of table 18, as by cap screws 158 passing through slots 160 in the wedges and into a slide support 162. Across the slot in the support 162 is a bridge bar 164 accommodating an adjusting screw 166 to adjustably shift the wedge 154 when it had been loosened. For this purpose the screw 166 may be threaded into the bar 164 and held to the bridge bar by a lock nut 168.

The cooperating wedges 155 on the top of table 10 are blocks with bevelled faces suitably fastened to the upper surface of the table 10.

Also mounted on the top of table 10, substantially centrally thereof, is a pair of slotted rails 170 (FIGS. 3, 4 and 7) accommodating a slide 171 with wings 172 riding in slots 173 of the rails. The right-hand end of the slide, as viewed from the operator in front of the machine, is forked to pivotally accommodate a dog 174 having a wedge nose 175 engageable in a recess 176 in a block 177 fastened to the underside of shiftable table 18. When the slide is moved to the right, the pivoted dog or tongue 174 will thrust the table 18 to the right, the cam faces on the cooperaing wedges enforcing the table to rise. The resultant of this motion is to bring the terminals to be soldered and the solder rings at the base of the terminals hard against the soldering tips. It should be noted that the combined pressure of the terminals against the soldering tips is considerable and will result in a lateral shift of the I-bar 112 against the tension of spring 142.

To shift the slide 171 there is provided a lever 178 pivoted at 180 to one of the rails 170 and riding in slotted ends of the rails. The right-hand face of the lever is a rounded cam face 182 to easily drive the slide 171 as the lever is pivoted.

The rear of the lever 178 (FIG. 3) rides on a rear plate 184 affixed to the top of table 10 and is driven by a roller 186 on the lower end of a suitable retaining screw 188 in the thickened part 190 of a piston rod 192 whose right-hand end as viewed from the front of the machine is driven by a piston in a cylinder 194 and whose left-hand end is guidingly supported in a U-shaped block 196 provided with a set screw 198 to limit the working stroke of the piston rod and thereby limit the lateral shift and rise of the table 18.

The fall of the table 18 to the left, as viewed from the front of the machine is limited by a set screw 200 in a stop block 202 fastened on the table 10.

The cam shaft 46 is oscillatably journalled by circular ends in bearing blocks 204, the ends of the shaft being extended beyond the blocks. The right-hand end of the shaft, as viewed from the front of the machine has fastened to it a driving arm 206 (FIGS. 1, 3 and 8) as by a screw 208 engaging split ends of the arm which embrace the shaft. The forward end of the arm is forked and pivotally engages a piston rod 210 of an inclined cylinder 212, the upper end of which cylinder is pivotally mounted in a pivot block 214 fastened to the underside of the table 18. The piston rod passes through a suitable opening in the table 18 and the cylinder passes through a suitable opening in the table 10. The cylinder pivots to accommodate the angular movement of the piston rod as it oscillates the arm 206.

The left-hand end of lobed shaft 46 (FIG. 1), as viewed from the front of the machine is provided with a switch operating arm 216 adapted to engage the button of a switch 218 when the shaft is oscillated to release the clamping fingers to block clamping positions. In addition to this switch 218, there is a pedal operated switch 220 located on the floor adjacent the machine, momentary contact switch 222 and normally open switch 224 supported by the post 74 operated by lowering of the left-hand end slide bar 92 and a switch 226 mounted on table 10 controlled by movement of table 18. Furthermore, two hand control switches 228 mounted on the table 10 are provided at the front of the machine for initiating descent movement of the lift bar and rise of the table 18.

How these switches are associated with the functioning of the machine will be made clear by a consideration of the circuit diagram in FIG. 13.

FIG. 13 shows circuit control elements across a 120 volt AC line. The heaters, not shown, are across a 240 volt AC line. In series across the 120 volt line is the normally closed switch contact 230 of a quick release slow make electromagnetic switch having an energizing coil 230W, the coil 234W of an electromagnet 234 operating the four way valve for cylinder 212, and pedal operated switch 220. Coil 230W is in series, across the line, with the contact 236 of a normally open quick make, slow release relay whose energizing coil 236W is in series across the line with momentary contact of trip switch 222, which momentarily closes the circuit only on the down stroke of the lift bar 86. The two hand control 228 is in series, across the line, with the coil 240W of a main relay 240. The main relay has three switch contacts 240A, 240B and 240C. Switch contact 240A is in series across the line with electromagnet coil 242W for operating the two way valve controlling the air cylinder 80. Contact 240B is in series across the line with switch 224 and electromagnetic coil 244W controlling the four way valve of cylinder 194, and contact 240C, in series with normally closed switch 226 establishes a holding circuit for the main relay winding 240W via line 246, contact 240C, switch 226 and a tie line 248 leading to the coil 240W. This last circuit effectively shorts out the two hand control 228 and the switch 218. Also, via line 250, the timer coil 230W is energized so long as the main relay and the switch 226 are closed, holding open the switch contact 230 and rendering treadle switch 220 inoperative.

The sequence of operation of parts is as follows: Depressing the treadle switch 220 closes the circuit through coil 234W of electromagnet 234 since the timer contact 230 is normally closed. Energization of the coil operates the cylinder 212 so as to cause rotation of cam shaft 46 and its cam 47, the cam depressing the rear ends of the fingers 22 and lifting the front ends so that a work piece may be removed and another inserted. Rotation of cam shaft 46 operates finger 216 to open safety switch 218 to prevent closing of a circuit through the two hand control 228. Release of the treadle restores the fingers 22 to clamping position and switch 218 to closed position.

Closing of the two hand control 228 is now effective to energize coil 240W of the main relay 240, the circuit being completed thru safety switch 218. When relay 240 is energized its three contacts 240A, 240B and 240C are closed. Closing of contact 240C establishes a holding circuit for the relay 240 via line 246, switch 226 and line 248. Also a circuit is established via line 250 to energize coil 230W to quickly open contact 230, thereby immediately disrupting the circuit through switch 220 so that the clamping fingers may not be operated until after a complete cycle of the machine had been completed. The timing of the relay with contact 230 is such that the contact will be closed a predetermined time after coil energization, the contact closing only after the lift bar 86 has been raised for a time.

Closing of main relay contact 240A via line 246 effects energization of coil 242W, causing venting of air from beneath the piston in cylinder 80 and allowing descent of the lift bar and the soldering tips.

As the lift bar descends, the switch 222 is momentarily closed thereby energizing the coil 236W of the slow release timer, closing its contact 236. This establishes a second circuit for the coil 230W of the quick release relay to maintain the contact 230 open to ensure against finger 22 movement so long as the lift bar is in down position, even after switch 226 has been opened, as will be described.

Also, as the lift bar continues to descend the switch 224 is closed thereby energizing electromagnetic coil 244W which causes the piston in cylinder 194 to pivot lever 178 and thereby effect shift of the table 18 laterally and to its elevated position, bringing the soldering tips 148 into effective soldering position. As the table shifts laterally, the switch 226 is opened breaking its holding circuit to the coil 240W. However, the coil 240W is still energized via the slow to release contact 236.

The timer of the slow to release contact 236 is timed to release after a sufficient soldering operation of the tips 148. Then the contact 236 opens. Opening of the contact effects deenergization of the main relay coil 240W and breaking of the contacts 240A, 240B and 240C, deenergizing coils 242W and 244W. Deenergization of coil 242W effects admission of air into the cylinder 80 to raise the lift bar. Deenergization of coil 244W allows the table 18 to shift laterally and descend, allowing switch 226 to close, ready for the next contact closing operation of the main relay. Lifting of the lift bar and the soldering tips permits opening of switch 224. Switch 222 is now in original position ready to again effect a momentary closing of the circuit to the coil 236W.

However, the holding fingers 22 are still held down and cannot be released by operation of treadle 220 because the contact 230 is still open. The contact 230 will be permitted to close, by predetermined setting of the relay time of contact 230, after the solder has set sufficiently. Then the treadle 220 may be operated to release the work held by the fingers 22.

Thus, there is provided an improved automated soldering machine whereby a multiplicity of solder connections are simultaneously consummated in an efficient and expeditious manner. The mechanical concepts incorporated into the device facilitate versatile operation in point soldering specific areas.

While there has been shown and described what is at present considered the preferred embodiment of the invention, it will be obvious to those skilled in the art that various changes and modifications may be made therein without departing from the scope of the invention as defined by the appended claims.

What is claimed is:

1. A soldering machine comprising a table for supporting a contact block having at least one longitudinal row of terminals and conductive material adjacent said terminals to which the terminals are to be soldered, a longitudinal row of soldering tips above said table, one for each terminal, means for heating said tips, said tips being movable from a position above the terminals on the block to a lower position wherein a tip is close to but not in contact with an intermediate portion of an associated terminal and means for raising said table and shifting it laterally in order to bring the base of the terminals in a direction toward the tips whereby solder placed at the base of the terminals will be fluxed about the terminals to effect soldering of the terminals and conductive material, and means enabling lowering and shifting of the table away from the tips and for raising the row of tips.

2. A soldering machine as set forth in claim 1 in which the soldering tips are mounted in a bar, said bar being movably mounted for longitudinal movement with spring means to urge said bar in a direction opposed to the lateral movement of the table during its rising movement to effect good heat conductive contact of the tips with the terminals and solder.

3. A soldering machine as set forth in claim 2 in which the bar is of good heat conductive material and an electrical heating element is affixed to each of opposite faces of the bar.

4. A soldering machine as set forth in claim 1, in which clamps are provided for clamping the block in position, means under control of the operator for effecting movement of the clamps to operative positions and time delay means effective to enable release of the clamps only after the tips and terminals have been separated from each other for a time sufficient for the solder to harden.

5. A soldering machine as set forth in claim 4 wherein the clamps comprise a multiplicity of parallelly aligned fingers in a single row, pivoted intermediate their ends and each normally spring pressed to clamping position and a cam shaft having a cam across the row of fingers is operative upon oscillation of the cam to release the fingers from the block, against the action of the springs, and means are provided, under control of the operator, prior to lowering of the tips, for effecting clamping or release of the contact block by said fingers.

6. A soldering machine as set forth in claim 5 in which control means are provided for operating the cam shaft to enable release of the fingers at a predetermined time interval after the tips have been raised.

7. A soldering machine as set forth in claim 1 in which time delay means is provided to maintain the table in raised position, and the tips in lowered position, for a time sufficient to enable complete fluxing of the solder.

8. A soldering machine as set forth in claim 7 in which clamps are provided for clamping a contact block in place and a second time delay means enables release of the clamps only a predetermined time after the table has been lowered and the tips raised.

9. A soldering machine as set forth in claim 1 in which the means for operating the table comprises cooperating cam surfaces on the underside of the table and on an underlying support and thrusting mechanism for shifting the table is provided comprising a power means, a slide operated by said power means, a dog pivoted to the slide, a block mounted on the under face of the table and a drive connection between the non-pivoted end of the dog and the block.

10. A soldering machine as set forth in claim 1, wherein means for shifting the position of the row of tips comprises a bridge plate atop the machine, a fluid pressure cylinder mounted on said bridge plate, a piston rod extending downwardly, a lift bar supported by said piston rod, posts guiding the vertical displacement of said lift bar, a heat conductive bar supported by said lift bar, soldering tips extending at an inclined angle from the lower face of said heat conductive bar and means for supplying fluid pressure to beneath the piston in the fluid pressure cylinder to raise the lift bar and parts carried thereby and to release said fluid pressure to enable the lift bar to gravitate to lowered position.

11. The structure of claim 10 wherein motion limiting rods are provided extending through the bridge plate and adjustably provided, above the bridge plate, with stop nuts to limit the downward gravitation of the soldering tips but enabling lift of the tips and supporting structure upon rise of the table.

References Cited
UNITED STATES PATENTS 2,821,617   1/1958   Knutsen _____ 219—85

RICHARD H. EANES, Jr., *Primary Examiner.*